Jan. 8, 1946.  C. R. BRIGGS  2,392,360
STEAM ENGINE VALVE MECHANISM
Filed Jan. 6, 1944  2 Sheets-Sheet 1

INVENTOR
CARL R. BRIGGS.
By Hyde and Meyer
ATTORNEYS

Jan. 8, 1946. C. R. BRIGGS 2,392,360
STEAM ENGINE VALVE MECHANISM
Filed Jan. 6, 1944 2 Sheets-Sheet 2
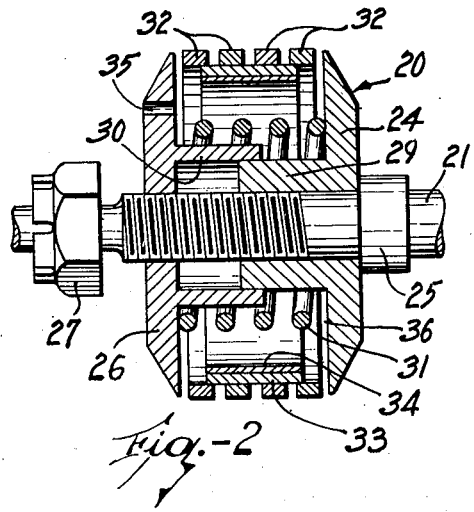
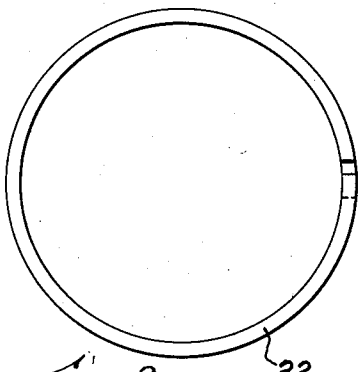
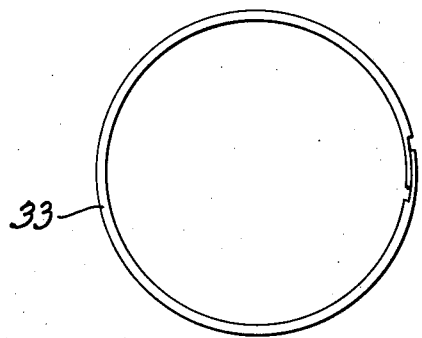
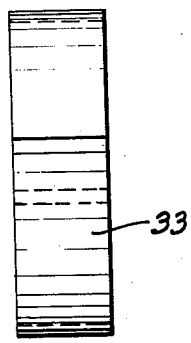
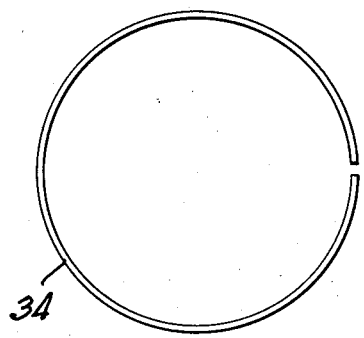
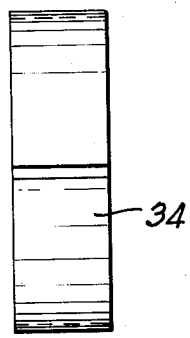
INVENTOR
CARL R. BRIGGS.
BY Hyde and Meyer.
ATTORNEYS.

Patented Jan. 8, 1946

2,392,360

UNITED STATES PATENT OFFICE 2,392,360

STEAM ENGINE VALVE MECHANISM

Carl R. Briggs, Mantua, Ohio

Application January 6, 1944, Serial No. 517,215

3 Claims. (Cl. 121—134)

This invention relates to steam engine valve mechanism, and more particularly to piston valve mechanism.

One object of the invention is to provide improved piston valve mechanism so arranged as to permit the engine to become self-scavenging as to any water which might collect beyond clearance volume and by its incompressibility interfere with engine operation or reduce efficiency.

Another object is to provide improved piston valve mechanism including sealing piston rings affording relief for condensate otherwise trapped during compression.

Still another object is to provide improved piston valve mechanism of relatively simple but highly efficient form, capable of convenient manufacture, assembly and adjustment, and which will not get out of order in service.

Further objects of the invention in part are obvious and in part will appear more in detail hereinafter.

In the drawings, which represent one suitable embodiment of the invention,

Fig. 2 is a detail view, on a larger scale, corresponding to Fig. 1 and showing one of the piston valves, with the parts separated for clarity of illustration;

Figs. 3 and 4 are respectively end and side elevations of one of the piston rings;

Figs. 5 and 6 are similar views of another ring; and

Figs. 7 and 8 are similar views of still another ring.

Figure 1:
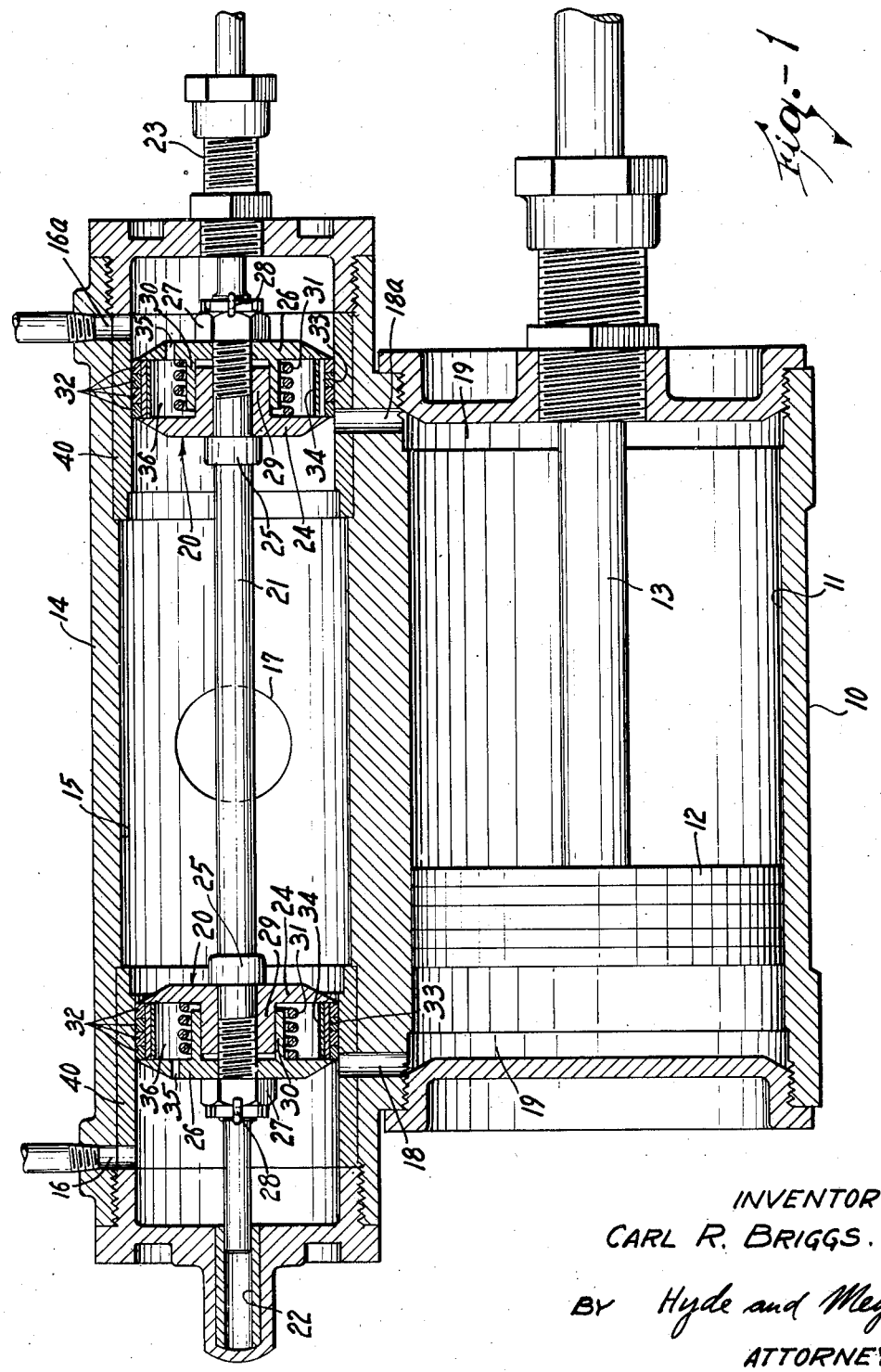
Fig. 1 is a central longitudinal section through the engine and its valve mechanism.

Referring to the drawings, the steam engine to be driven is shown more or less conventionally. While the invention may be applied to single acting engines, it is shown applied to a double acting engine including a cylinder 10 in the chamber 11 of which travels the reciprocating piston 12 carried by a piston rod 13. The crosshead, connecting rod, crankshaft and valve operating gear require no illustration because they may be of conventional forms and form no part of the invention.

The valve mechanism is housed within a valve casing 14 attached to or forming a part of the engine cylinder. This valve casing has a cylindrical chamber 15 communicating with two steam supply ports or connections 16, 16a, with an exhaust opening 17, and with two steam ports or channels 18, 18a communicating with the clearance spaces 19 at the ends of the engine chamber 11.

Within the valve chamber are located two like piston valves, marked generally 20, mounted in spaced relation on a valve rod 21 guided at 22 in one end of the valve casing and at the other end extending out through a suitable stuffing box 23 for operation from the engine crankshaft by the usual valve gear (not shown).

Since the piston valves are alike description of one will suffice for both. Each comprises a stationary head 24 seated against a rigid collar 25 of the valve rod and an adjustable head 26 slidable on the rod and adjustable by a nut 27 capable of being locked, a castellated nut and a cotter pin 28 being shown for the purpose. Heads 24, 26 are provided with telescoping sleeves 29, 30 and are normally urged apart by a spring 31. In the cavity or space 36 between them are mounted suitable sealing piston rings outwardly expansible against the wall of the valve chamber, or the lining sleeves 40 inserted therein. Any suitable arrangement of rings may be employed. The drawings show four narrow outer split rings 32, lying side by side, all engaging the chamber wall. Within them are two wider split rings sleeved one upon the other, to-wit, an outer ring 33 and an inner ring 34. Nuts 27 are adjusted to move the heads 24, 26 together until, with the parts assembled and in operative position, the rings closely fit each other but are movable readily. On each piston valve that head 24 or 26 which is presented to the live steam space (head 26 in the form shown) is provided with a small port or opening 35 supplying full steam pressure to the cavity 36 within the piston.

The operation is as follows:

In Fig. 1 the parts are shown in the positions they occupy shortly after the admission point. Steam is entering the engine cylinder through the port 18, and on the opposite side of the piston is moving to exhaust through the port 18a. The engine piston has passed the dead center point and is moving toward the right. The operation of the left-hand piston valve will be described, it being understood that the right-hand valve operates in the same manner.

When some 20 to 30 per cent or more of the stroke has been completed, the valve moves to the left and closes port 18 at the cut-off point. During the remainder of the stroke the steam expands adiabatically to the accompaniment of decreasing pressure. Near the end of the stroke the valve again opens the port, connecting the cylinder chamber with exhaust, at the release point. The engine chamber remains connected with exhaust during the return stroke of the piston until approximately ⅔ of the return stroke has been completed, when the valve again closes port 18, and the remaining steam is trapped in the cylinder and compressed.

It is during this compression stage, and slightly before the engine piston reaches the dead center point, that the piston valve of this invention permits evacuation or scavenging of water of condensation which may have lodged or collected in the engine cylinder ahead of the piston. Not only is the water crowded into the clearance space by the adiabatic expansion of the steam in the working end of the engine chamber, but the engine piston is also subject to the effect of the flywheel. As previously stated, with the various moving parts in the position shown in Fig. 1, the engine piston 12 has passed dead center at the left end of its stroke and is moving to the right. The valve piston 20 at the right of Fig. 1 is slowly moving to the left and is just beginning to close port 18a. Obviously, the path of travel of valve piston 20 is considerably shorter than that of engine piston 12 and consequently its rate of movement is slower. By the time piston 12 has passed the half way mark in its path of travel, and is approaching right dead center, valve piston 20 has just closed port 18a, and piston 12 begins to build up back pressure in the right end of the engine cylinder.

At this point the situation with respect to piston 20 may be briefly noted. By reason of the aperture 35 in movable end head 26, the steam pressure within piston 20 is equal to the pressure of the steam from the supply source. Were this not so, the outer steam pressure on head 26 would move it to bind rings 32, 33, 34 and reduce their mobility practically to zero, impairing their sealing efficiency. Equalization of pressure on the inner and outer surfaces of head 26 leaves it under control of spring 31, as restrained by nut 27, and leaves rings 32 free from binding side pressure against each other, so that they are free to flex inwardly if pressure on their outer periphery builds up so as to overcome internal steam pressure.

Returning to piston 12 which is building up back pressure in approaching right dead center, if this accumulated back pressure passes the critical balance value, and exceeds the pressure within piston 20, any one or more of rings 32 which happen to be above port 18a are forced upwardly, carrying rings 33 and 34 before them. Relief of back pressure to the lower interior portion of piston 20 is thereby permitted, and such excess pressure is further relieved towards the left between rings 33 and 34 and around the lower peripheral edge of fixed head 24, which is of reduced peripheral extent, into the exhaust portion of the piston valve chamber.

By the time the piston 12 has moved to right dead center, where maximum back pressure is normally incurred with previously known constructions, destructive, or injurious pressure has been relieved in the present construction, and engine efficiency is greatly enhanced.

The operation of the disclosed structure has been detailed with reference to fluid pressure of any kind, and is obviously the same whether the back pressure is developed by residual steam or by condensed liquid. In either case the result produced is identical.

The mechanism of relief past the rings will vary somewhat depending on valve timing, and depending on which individual ring or rings 32 happens to be in registry with port 18a when the critical back pressure is developed. If it should be the two rings nearest fixed head 24, the path of relief is obvious. If it should be the intermediate rings 32, or the ones nearest the right end, the venting of pressure will occur between compressed rings 33, 34 and the rings 32 which are not over port 18a, since, regardless of which one of rings 32 is raised, rings 33 and 34 are necessarily raised thereby. It will be understood of course that the situation is in a state of continual change, since pistons 20 are always moving when they register with apertures 18 and 18a.

Of course, apart from the matter of scavenging of water of condensation, and considering the piston valves only from a standpoint of their control of admission and exhaust of steam, said piston valves permit no escape of live steam to exhaust because the pistons are adjusted so that the rings are in close contact with each other and with the piston heads, and the rings are held outwardly by their own expansion against the wall of the valve chamber, so that all leakage is avoided or prevented.

The construction is quite simple, is capable of convenient assembly, setting up and adjustment, and is durable and efficient in operation. Other advantages of the invention will be apparent to those skilled in the art.

What I claim is:

1. Engine valve mechanism of the character described, comprising a valve housing having a cylindrical chamber provided with steam supply, engine and exhaust ports, and a reciprocating rod carrying a valve slidable in said chamber and cooperating with said ports, said valve in general being of piston form and including relatively adjustable spaced disc-form heads on said rod forming a cavity between them, spring means operatively engaging the opposed inner surfaces of said adjustable heads, and resiliently urging said heads apart, means providing communication from the steam supply to said cavity, and a resilient expansible piston ring exposed to the pressure in said cavity and sensitive to abnormal rise of pressure in the engine clearance space and thereby adapted during compression to permit escape to exhaust of condensate trapped in said space.

2. Engine valve mechanism of the character described, comprising a valve housing having a cylindrical chamber provided with steam supply, engine and exhaust ports, and a reciprocating rod carrying a valve slidable in said chamber and cooperating with said ports, said valve in general being of piston form and including a stationary head fixed in position with respect to said rod, a movable head, slidable along said rod, adjustable stop means for limiting slidable movement of said movable head along said rod, resilient biasing means disposed between and in contact with both said heads to normally maintain a maximum spacing between said heads but to permit said movable head to yield towards said stationary head said spacing between said heads constituting a cavity therebetween, means providing a communication from the steam supply to said cavity, and a resilient expansible and compressible piston ring exposed to the pressure in said cavity and sensitive to abnormal rise of pressure in the engine clearance space, and thereby adapted, during compression to permit escape to exhaust, of condensate trapped in said space.

3. Engine valve mechanism of the character described, comprising a valve housing having a cylindrical chamber provided with steam supply, engine and exhaust ports, and a reciprocating rod carrying a valve slidable in said chamber and cooperating with said ports, said valve in general being of piston form and including a stationary head fixed in position with respect to said rod, a movable head, slidable along said rod, adjustable stop means for limiting slidable movement of said movable head along said rod, resilient biasing means disposed between and in contact with both said heads to normally maintain a maximum spacing between said heads but to permit said movable head to yield towards said stationary head, said spacing between said heads constituting a cavity therebetween, means providing a communication from the steam supply to said cavity, a plurality of sealing rings disposed side by side in said cavity, and radially outwardly expansible against said valve housing, a lining sleeve within said sealing rings and likewise radially outwardly expansible against said sealing rings, said sealing rings and lining sleeve being also inwardly compressible, and being exposed to the pressure in said cavity and sensitive to abnormal rise of pressure in the engine clearance space, and thereby adapted during compression to permit escape to exhaust, of condensate trapped in said space.

CARL R. BRIGGS.